United States Patent
Plumettaz et al.

(10) Patent No.: US 9,552,183 B2
(45) Date of Patent: Jan. 24, 2017

(54) METHODS AND SYSTEMS FOR PERFORMING QUEUE-BASED ASSIGNMENT OF PRINT JOBS IN A MULTI-SITE PRINT PRODUCTION ENVIRONMENT

(71) Applicant: Xerox Corporation, Norwalk, CT (US)

(72) Inventors: Tulia Plumettaz, Cambridge, MA (US); Pallavi Manohar, Maharashtra (IN); Eric Michael Gross, Rochester, NY (US); Manoj Gupta, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/750,199

(22) Filed: Jun. 25, 2015

(65) Prior Publication Data

US 2016/0378407 A1 Dec. 29, 2016

(51) Int. Cl.
*G06F 15/00* (2006.01)
*G06F 3/12* (2006.01)
*G06Q 10/06* (2012.01)

(52) U.S. Cl.
CPC ............. *G06F 3/126* (2013.01); *G06F 3/1204* (2013.01); *G06F 3/1211* (2013.01); *G06F 3/1267* (2013.01); *G06F 3/1275* (2013.01); *G06F 3/1282* (2013.01); *G06F 3/1291* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 7,626,717 B2 | 12/2009 | Rai et al. | |
| 2003/0081974 A1 | 5/2003 | Grohs | |
| 2012/0044529 A1* | 2/2012 | Sugimoto | G06F 3/1212 358/1.15 |
| 2014/0002854 A1* | 1/2014 | Banner | G06F 3/1204 358/1.15 |
| 2015/0278656 A1* | 10/2015 | Mitsumori | G06F 3/1211 358/1.15 |

* cited by examiner

*Primary Examiner* — Saeid Ebrahimi Dehkord
(74) *Attorney, Agent, or Firm* — Fox Rothschild LLP

(57) ABSTRACT

A system for performing queue-based routing of print jobs in a multi-site print production environment may include an electronic dispatch system having a scheduling queue, at least one processor and a computer-readable storage medium. The computer-readable storage medium may include programming instructions that, when executed, cause the processor to receive print jobs from client computing devices, identify one or more print shops, select a set of print jobs from the scheduling queue that are to be assigned to the print shops for completion, generate a feasibility matrix for the selected print jobs, determine a preliminary assignment of the selected print jobs to the identified print shops using a set cover heuristic, use a linear programming heuristic to determine a final assignment of the selected print jobs to the identified print shops, and route each of the selected print jobs to an assigned print shop as specified by the final assignment.

14 Claims, 6 Drawing Sheets

METHODS AND SYSTEMS FOR PERFORMING QUEUE-BASED ASSIGNMENT OF PRINT JOBS IN A MULTI-SITE PRINT PRODUCTION ENVIRONMENT

BACKGROUND

Managed print service providers may use a network of print shops to deliver completed jobs to clients. However, such an approach often leads to inefficiency and increased costs for such jobs.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system for performing queue-based routing of print jobs in a multi-site print production environment may include an electronic dispatch system having a scheduling queue, at least one processor and a computer-readable storage medium. The computer-readable storage medium may include one or more programming instructions that, when executed, cause the processor to receive a plurality of print jobs from one or more client computing devices where each print job is associated with a completion deadline, store the received print jobs in the scheduling queue, identify one or more print shops in communication with the electronic dispatch system, select a set of print jobs from the scheduling queue that are to be assigned to the print shops for completion, and generate a feasibility matrix for the selected print jobs. The feasibility matrix may indicate, for each selected print job, one or more of the print shops that are able to process the print job and satisfy the corresponding completion deadline. The computer-readable storage medium may include one or more programming instructions that, when executed, cause the processor to determine a preliminary assignment of the selected print jobs to the identified print shops using a set cover heuristic that accepts as input the feasibility matrix and one or more cost functions associated with one or more of the print shops, where each cost function is representative of a cost of processing and shipping the selected print jobs to the corresponding print shop, use a linear programming heuristic to determine a final assignment of the selected print jobs to the identified print shops, where the final assignment minimizes a processing cost associated with the selected print shops, and the linear programming heuristic accepts as input the preliminary assignment, the feasibility matrix and one or more cost functions associated with one or more of the print shops, and route each of the selected print jobs to an assigned print shop as specified by the final assignment.

In an embodiment, a method for performing queue-based routing of print jobs in a multi-site print production environment may include, by one or more processors of an electronic dispatch system, receiving a plurality of print jobs from one or more client computing devices, where each print job is associated with a completion deadline, storing the received print jobs in a scheduling queue of the electronic dispatch system, identifying one or more print shops in communication with the electronic dispatch system, selecting a set of print jobs from the scheduling queue that are to be assigned to the print shops for completion, and generating a feasibility matrix for the selected print jobs. The feasibility matrix may indicate, for each selected print job, one or more of the print shops that are able to process the print job and satisfy the corresponding completion deadline. The method may include determining a preliminary assignment of the selected print jobs to the identified print shops using a set cover heuristic that accepts as input the feasibility matrix and one or more cost functions associated with one or more of the print shops, wherein each cost function is representative of a cost of processing and shipping the selected print jobs to the corresponding print shop, using a linear programming heuristic to determine a final assignment of the selected print jobs to the identified print shops, where the final assignment minimizes a processing cost associated with the selected print shops, and the linear programming heuristic accepts as input the preliminary assignment, the feasibility matrix and one or more cost functions associated with one or more of the print shops, and routing each of the selected print jobs to an assigned print shop as specified by the final assignment.

DETAILED DESCRIPTION

Figure 1:
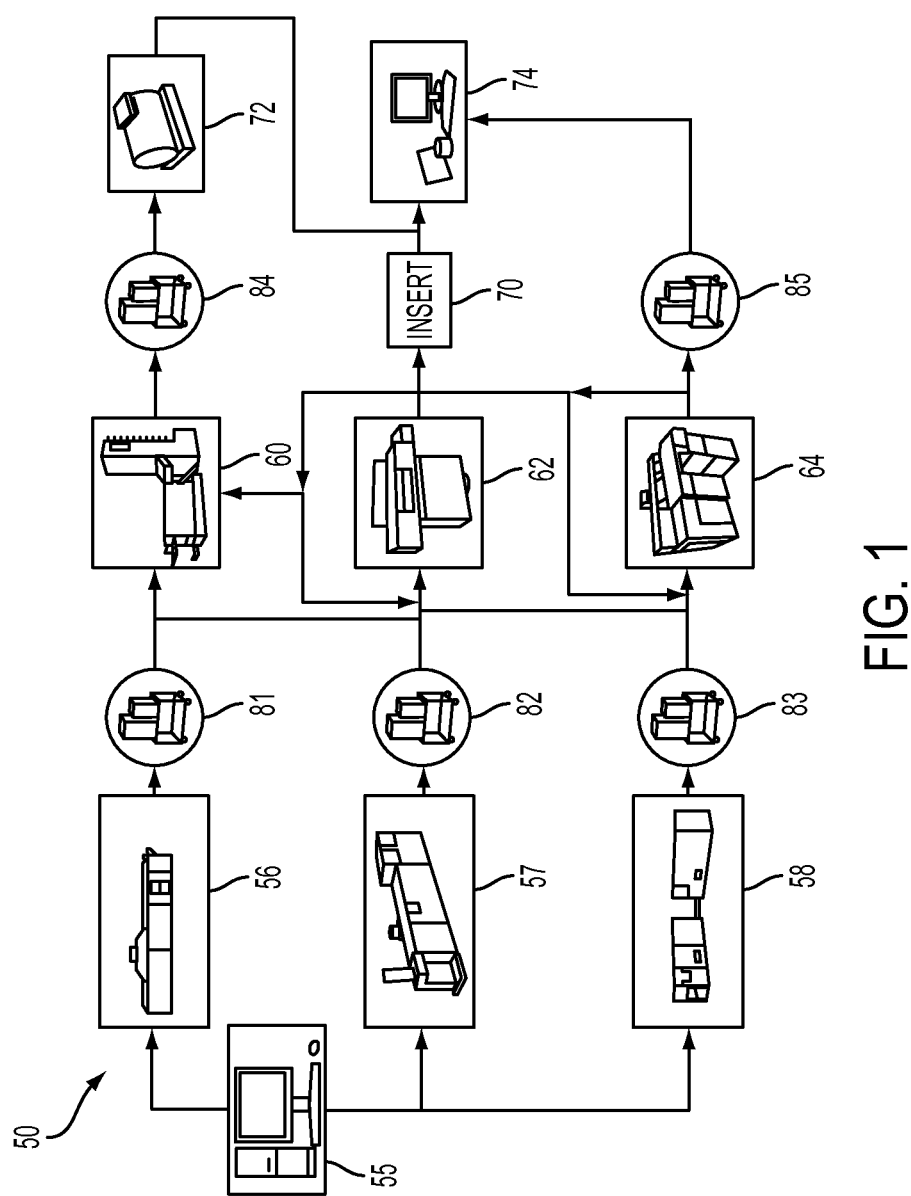
FIG. 1 shows an example of a production environment according to an embodiment.

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "feasibility matrix" refers to a data structure that stores data representing, for one or more print jobs, an indication of one or more print shops that are able to process the print jobs by their associated completion deadlines.

A "job" refers to a logical unit of work that is to be completed for a customer.

A "job function" refers to one or more processing steps associated with processing a job. In a print production environment, a "print job function" refers to one or more processing steps associated with processing a print job. Example print job functions may include, without limitation, printing, binding, collating, scanning and/or the like.

A "job size" refers to a quantity of a job to be processed. In a print production environment, a "print job size" refers to a quantity of a print job to be processed, such as, for example, a number of pages, a number of impressions, a number of units and/or the like.

A "job type" refers to a combination of one or more job functions required to process a job. In a print production environment, a "print job type" refers to a combination of one or more print job functions required to process a print job. For example, a print job type of a print job that requires printing and cutting may be {printing, cutting}.

A "linear programming (LP) heuristic" is a heuristic used to solve linear programming. An LP heuristic may be a combinatorial approach to solving linear programming according to an embodiment.

A "multi-site production environment" refers to two or more production environments in communication with a computing device, where the production environments and computing device are located remotely from one another. The production environments may be remote from each other but may be geographically collocated. For example, production environments may be located in the same building. In other embodiments, production environments may be separated by large geographic distances.

A "print job" refers to a job processed in a print shop.

A "print production resource" is a physical device capable of processing at least a portion of a print job. Example print production resources may include black-and-white printers, color-printers, scanners, inserters, collators, binders, cutters, multi-function devices and/or the like.

A "print shop" refers to a grouping of one or more document production resources, such as printers, cutters, collators and the like. Example print shops include, without limitation, a printing service provider, or it may be a document production group within a corporation or other entity, such as a work area that contains one or more printers. Additionally, a print shop may communicate with one or more servers or other electronic devices by way of a local area network or a wide area network, such as the Internet, the World Wide Web or the like.

A "processing cost" is a cost associated with shipping one or more print jobs to one or more assigned print shops and processing the print jobs by the assigned print shops.

A "resource" is a physical device capable of processing at least a portion of a job.

A "scheduling queue" is a data structure configured to temporarily store information, including, but not limited to, print jobs that are to be scheduled. A scheduling queue may be implemented as a hardware queue.

A "set cover heuristic" is a heuristic used to solve a set cover problem. A set cover heuristic may be a combinatorial approach to solving a set cover problem according to an embodiment.

FIG. 1 shows an example of a production environment 50, in this case, example elements of a print production environment or print shop, according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
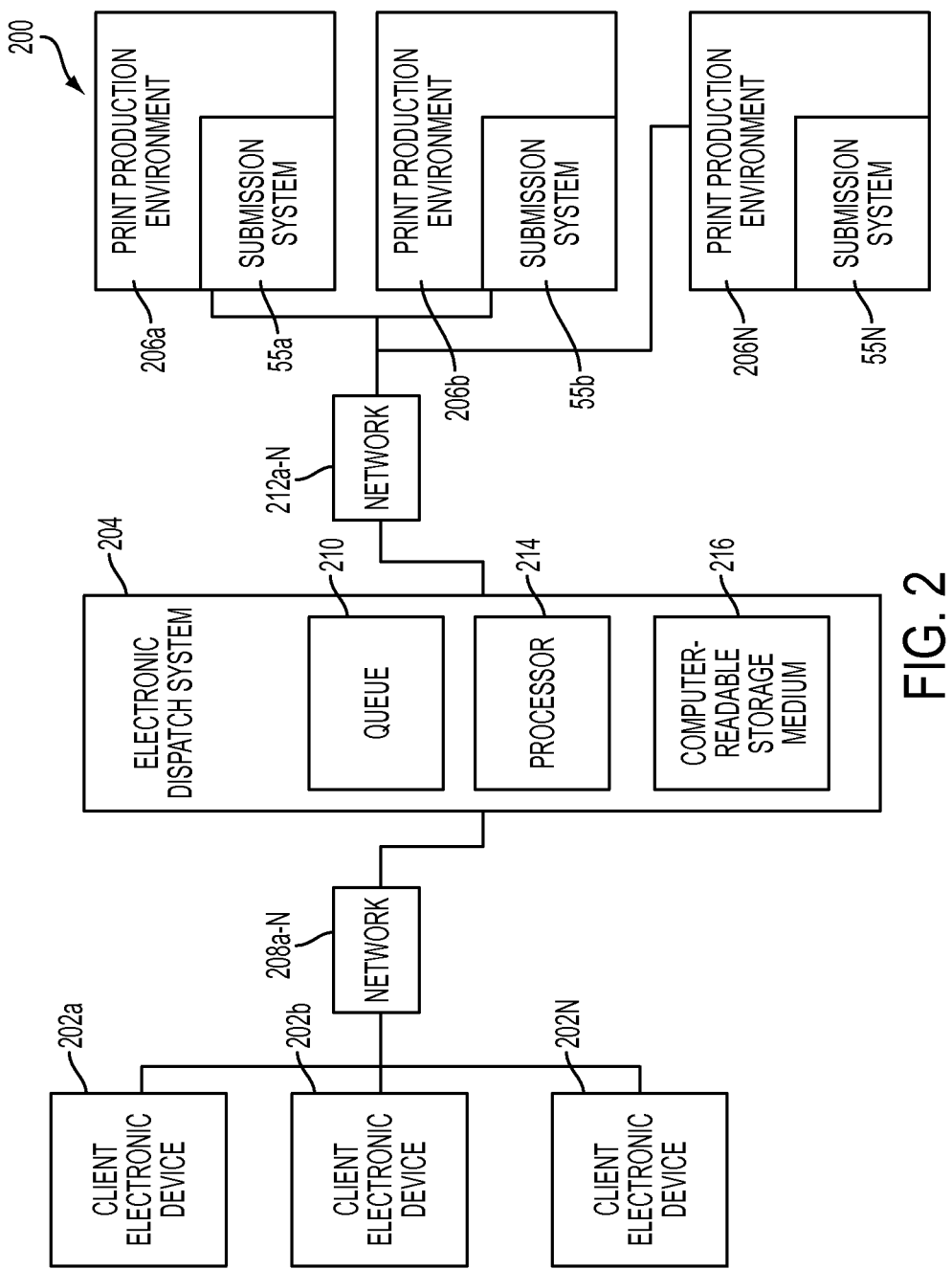
FIG. 2 illustrates an example of a multi-site production environment according to an embodiment.

FIG. 2 illustrates an example of a multi-site production environment, in this case a multi-site print production environment, according to an embodiment. As illustrated by FIG. 2, a multi-site production environment 200 may include one or more client electronic devices 202a-N, an electronic dispatch system 204, and a plurality of print production environments 206a-N.

In an embodiment, a client electronic device may receive one or more jobs to be processed that are associated with a particular client. For instance, client electronic device 202a may receive jobs from Client A or customers of Client A, and client electronic device 202b may receive jobs from Client B or customers of Client B.

In various embodiments, one or more of the client electronic devices 202a-N may be in communication with an electronic dispatch system 204 via one or more communication networks 208a-N. A communication network 208a-N may be a local area network (LAN), a wide area network (WAN), a mobile or cellular communication network, an extranet, an intranet, the Internet and/or the like.

In an embodiment, an electronic dispatch system 204 may include one or more processors 214, one or more scheduling queues or buffers 210, and a computer-readable storage medium 216. A client electronic device 202a-N may send one or more jobs to the electronic dispatch system 204 for scheduling and routing to one or more print production environments 206a-N. The electronic dispatch system 204 may receive one or more jobs and may store the jobs in a scheduling queue or buffer 210 before routing the jobs to one or more print production environments 206a-N.

In various embodiments, the electronic dispatch system 204 may be in communication with one or more print production environments 206a-N via one or more communication networks 212a-N. A communication network 212a-N may be a local area network (LAN), a wide area network (WAN), a mobile or cellular communication network, an extranet, an intranet, the Internet and/or the like.

As illustrated by FIG. 2, a print production environment 206a-N may include an electronic submission system 55a-N. An electronic submission system 55a-N may receive one or more jobs from the electronic dispatch system 204, and may route the received jobs to one or more production resources in the print production environment 206a-N.

In various embodiments, one or more client electronic devices 202a-N and one or more print production environments 206a-N may be located remotely from one another and remotely from the electronic dispatch system 204. For instance client electronic device 202a may be located at Location A, client electronic device 202b may be located at Location B and client electronic device 202N may be located at Location C. The electronic dispatch system 204 may be located at Location D, and print production environments 206a-N may be located at Location E, Location F and Location G, respectively. The locations may be different geographic locations such as, for example, different rooms, departments, floors, buildings, counties, cities, towns, states and/or the like. Additional and/or alternate location configurations may be used within the scope of this disclosure.

In various embodiments, one or more of the print production environments 206a-N may be managed and/or operated by one or more different entities. For example, Entity A may operate print production environment 206a, while Entity B may operate print production environment 206b, and Entity N may operate print production environment 206N. Similarly, the electronic dispatch system 204 may be managed and/or operated by an entity that is different than an entity that manages and/or operates one or more of the print production environments 206a-N.

Figure 3:
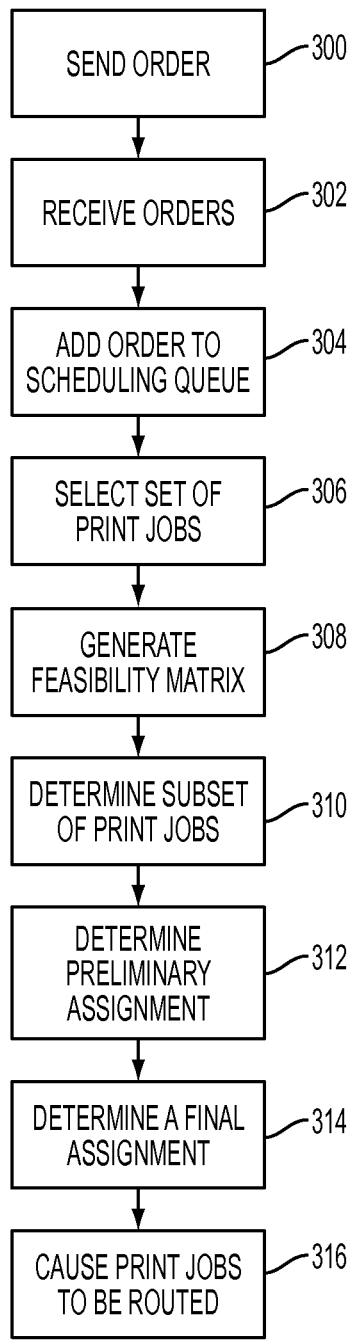
FIG. 3 illustrates an example method of dispatching print jobs according to an embodiment.

FIG. 3 illustrates an example method of dispatching print jobs according to an embodiment. As illustrated by FIG. 3, one or more client electronic devices may send 300 one or more orders to an electronic dispatch system, and the electronic dispatch system may receive 302 the one or more orders. Each order may include one or more print jobs to be completed. The electronic dispatch system may add 304 the received orders to an associated scheduling queue.

The electronic dispatch system may select 306 a set of print jobs from its queue. The selected set may include print jobs that are to be assigned to one or more print shops for completion. In an embodiment, the electronic dispatch system may select 306 a set that includes print jobs that have been received during a certain time period. In another embodiment, the electronic dispatch system may select 306 a set that includes all print jobs currently in the queue. In various embodiments, the selected print jobs may each have been received from the same client electronic device or from a client electronic device associated with the same client. In other words, the selected print jobs may each be print jobs that are received from the same client.

The set of jobs that are selected from the queue may be represented by $J_1, \ldots, J_l$. $S_1, \ldots, S_m$ may denote the print shops in the network, k may represent the number of jobs in the queue waiting to be processed, and T may represent a threshold amount of time that a print job has waited in the queue. As illustrated by FIG. 3, the electronic dispatch system may generate 308 a feasibility matrix. A feasibility matrix W for the set of jobs $J_1, \ldots, J_l$ in the set of print shops $S_1, \ldots, S_m$ may be defined as an l×m dimension matrix such that for a given job index j and shop index s, $W_{js}$ has a value '1' if job $J_j$ can be processed on shop $S_s$, together with all other jobs with indices k∈1, ..., l for which $W_{ks}$=1. In other words, the $s^{th}$ column of the feasibility matrix W indicates a set of jobs that could be completed together in shop s before their deadlines.

In order to assign jobs $J_1, \ldots, J_l$ to print shops to minimize the total enterprise processing cost, the print shops that are able to process jobs $J_1, \ldots, J_l$ in a timely manner are identified. For example, if three jobs are to be assigned for processing, Job 1 and Job 2 may be both processed in Print Shop 1 and be delivered before their deadlines. Similarly, Job 1 and Job 3 may be processed together, but Job 2 and Job 3 cannot be both processed in Print Shop 1 and still be delivered in time. In this case, the column of the feasibility matrix that corresponds to shop 1 may be $[1, 1, 0]^T$ or $[1, 0, 1]^T$, but not $[0, 1, 1]^T$ nor $[1, 1, 1]^T$.

An electronic dispatch system may take into consideration the current workload of one or more print shops, the capabilities of one or more print shops, the deadline of one or more print jobs, the functions associated with the print job and/or the like in determining whether a certain print shop is capable of processing a certain print job in generating 308 the feasibility matrix. And even for the same set of print jobs, a print shop may process a particular print job in time if assigned to one or more print shops first, but not if it were assigned later. As such, sequencing decisions are important in the generation of the feasibility matrix.

In an embodiment, an electronic dispatch system may determine 310, for each print shop in the set of print shops, a subset of print jobs from the set of print shops. The subset of print jobs may include one or more print jobs that the shop can process while meeting the deadlines associated with the print jobs. An electronic dispatch system may determine 310 a subset of print jobs using one of at least two approaches—by minimizing the number of print jobs without an offer for processing, or by prioritizing deadlines.

Figure 4:
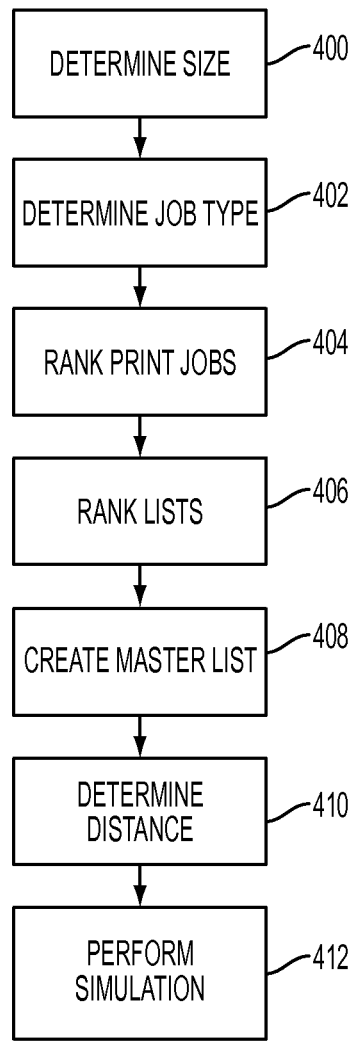
FIG. 4 illustrates a flow chart of an example method of determining a subset of print jobs by minimizing the number of print jobs without an offer for processing according to an embodiment.

FIG. 4 illustrates a flow chart of an example method of determining 310 a subset of print jobs by minimizing the number of print jobs without an offer for processing according to an embodiment. The goal of this approach is to compute a subset in which as many print jobs as possible have an offer to be processed in time by at least one print shop.

The number of print shops in the network that are available at an arbitrary time t may be represented by m, and the number of print jobs to be assigned may be represented by 1. Each print job may be characterized by its deadline, its print job type, its processing time and/or its delivery information. It may also be assumed that there are no more than h different types of print jobs at play.

As illustrated by FIG. 4, an electronic dispatch system may determine 400 a size associated with each selected print job. An electronic dispatch system may determine 400 a size associated with a print job by accessing size information that is received along with the print job. Alternatively, an electronic dispatch system may determine 400 a size of a print job by counting a number of impressions, pages and/or the like associated with a print job.

An electronic dispatch system may determine 402 a job type associated with each selected print job. The electronic dispatch system may determine 402 a job type associated with each selected print job by accessing job type information that is received along with the print job. Alternatively, an electronic dispatch system may determine 402 a job type associated with a print job by analyzing one or more job functions required by the print job. Table 1 illustrates example print jobs and corresponding print job types and sizes according to an embodiment.

TABLE 1

| Print Job | Print Job Type | Size (impressions) |
|---|---|---|
| Print Job 1 | Job Type A | 2,450 |
| Print Job 2 | Job Type B | 890 |
| Print Job 3 | Job Type B | 1,236 |
| Print Job 4 | Job Type C | 4,902 |

TABLE 1-continued

| Print Job | Print Job Type | Size (impressions) |
|---|---|---|
| Print Job 5 | Job Type A | 900 |
| Print Job 6 | Job Type C | 502 |

In an embodiment, an electronic dispatch system may rank 404 the print jobs in descending order of their size for each type of print job such that larger-sized print jobs have a higher priority than smaller-sized print jobs. The ranked print jobs may be referred to a list. As such, the ranking process may result in at most h number of lists, one list per each print job type. Table 2 illustrates an example list of ranked print jobs for Job Type A, Table 3 illustrates an example list of ranked print jobs for Job Type B, and Table 4 illustrates an example list of ranked print jobs for Job Type C.

TABLE 2

| Print Job | Print Job Type | Size (impressions) |
|---|---|---|
| Print Job 1 | Job Type A | 2,450 |
| Print Job 5 | Job Type A | 900 |

TABLE 3

| Print Job | Print Job Type | Size (impressions) |
|---|---|---|
| Print Job 3 | Job Type B | 1,236 |
| Print Job 2 | Job Type B | 890 |

TABLE 4

| Print Job | Print Job Type | Size (impressions) |
|---|---|---|
| Print Job 4 | Job Type C | 4,902 |
| Print Job 6 | Job Type C | 502 |

In an embodiment, an electronic dispatch system may store one or more lists in memory or other computer-readable storage media.

As illustrated by FIG. 4, an electronic dispatch system may rank 406 the generated lists. In an embodiment, an electronic dispatch system may rank 406 the lists in an arbitrary order represented by $L_1, L_2, \ldots, L_h$. An electronic dispatch system may create 408 a master list from one or more of the generated lists. A master list may be represented by L. In an embodiment, an electronic dispatch system may create 408 a master list by adding one print job at a time from each of the lists $L_1, L_2, \ldots, L_h$ in descending order of their priority. For example, an electronic dispatch system may create a master list by adding the highest priority print job from the highest priority list, followed by the highest priority print job from the next highest priority list, and so on until all of the print jobs from each list are assigned to the master list. Table 5 illustrates an example master list corresponding to the lists illustrated by Table 2, Table 3 and Table 4 according to an embodiment.

| Print Job | Print Job Type | Size (impressions) |
|---|---|---|
| Print Job 1 | Job Type A | 2,450 |
| Print Job 3 | Job Type B | 1,236 |
| Print Job 4 | Job Type C | 4,902 |
| Print Job 5 | Job Type A | 900 |
| Print Job 2 | Job Type B | 890 |
| Print Job 6 | Job Type C | 502 |

Referring back to FIG. 4, an electronic dispatch system may determine 410 a distance between a client location associated with the print jobs and each print shop in the set of print shops $S_1, \ldots, S_m$. In certain embodiments, an electronic dispatch system may be in communication with a database or other list of locations of the print shops and the client location. The electronic dispatch system may provide this information to a mapping or other program to determine the distances between the client location and the print shop locations. In another embodiment, an electronic dispatch system may be in communication with a database or other list of distances between the print shops and the client location.

In an embodiment, an electronic dispatch system may rank the print shops in ascending order of their distance to the client's location. The electronic dispatch system may store this print shop ranking in memory or other computer-readable storage media.

In an embodiment, for each print job index $j \in 1, \ldots, 1$, an electronic dispatch system may define a variable $x_j$ whose value is the next print shop to which print job j will attempt to be assigned. The variable $x_j$ may initially take the value '1' for every job $j \in 1, \ldots, 1$. For each print shop index i, an electronic dispatch system may define a set of jobs, $S_1$, that is initially empty. At termination, the set $S_i$ for an arbitrary shop i may be a set of print jobs that can be completed before their deadlines by print shop i.

In an embodiment, m may represent the total number of print shops. While $x_j < m$ for at least one print job in $\{1, \ldots, 1\}$, an electronic dispatch system may perform 412 a simulation of the operation of shop $x_j$ with the print jobs in the set $S_{x_j} \cup \{j\}$. If all of the print jobs in the set $S_{x_j} \cup \{j\}$ are completed before their deadlines, an electronic dispatch system may add job j to set $S_{x_j}$. If one or more print jobs in the set $S_{x_j} \cup \{j\}$ are not completed before their deadlines, an electronic dispatch system may take no action. An electronic dispatch system may update $x_j$ to $x_j+1$, and may move the print job at the top of the list to the bottom of the list. An electronic dispatch system may, for each print shop $i \in 1, \ldots, m$, return a feasibility matrix in the form of a binary n-dimensional vector that takes value '1' in the $j^{th}$ position if job j is in the set $S_i$. Otherwise, it may take a value of '0'.

Using this approach, it may hold that for every job j that does not receive at least one offer, no other job of the same type with a size at least $w_j$ is assigned to more than one shop. It may also hold that the total workload of the print jobs of the same type of print job j with size at most $\omega_j$ that are accepted is upper bounded by $\omega_j$.

Figure 5:
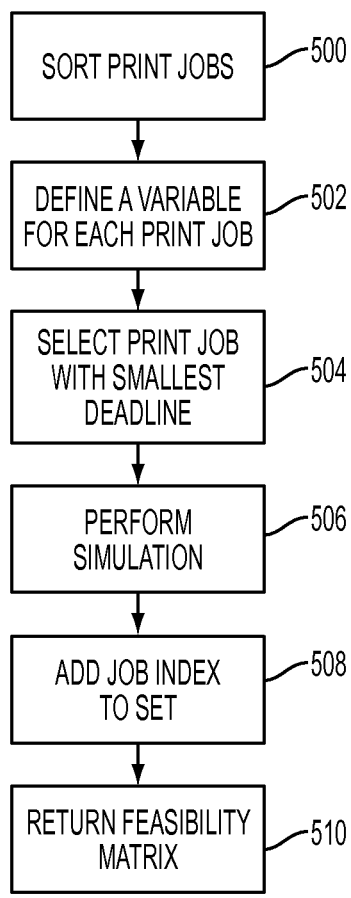
FIG. 5 illustrates a flow chart of an example method of determining a subset of print jobs by prioritizing print jobs by deadline according to an embodiment.

FIG. 5 illustrates a flow chart of an example method of determining 310 a subset of print jobs by prioritizing print jobs by deadline according to an embodiment. Instead of aiming to guarantee that as many print jobs as possible receive an offer, the approach described with reference to FIG. 5 aims to provide one or more offers for print jobs with tighter deadlines, and provide a richer feasibility matrix as input to the next step of print job assignments.

As illustrated by FIG. 5, an electronic dispatch system may sort 500 a batch of l number of print jobs, $J_1, \ldots, J_l$ by increasing order of deadlines. For instance, an electronic dispatch system may determine a deadline, such as a completion deadline, associated with one or more print jobs in a batch, and may order the print jobs in increasing order of deadlines, meaning that the print jobs having the most immediate deadlines are listed first. In general, it may be assumed that if the size of a first job is less than the size of a second job, that the deadline associated with the first job occurs before the deadline associated with the second print job.

In an embodiment, an electronic dispatch system may define 502 a variable $x_j$ for each print job with an index $j \in 1$ that takes as a value the next shop to which a print job with index j will attempt to be assigned. The variable $x_j$ may initially take a value of '1' for each job $j \in 1, \ldots, n$. For each shop, an electronic dispatch system may define a set, $S_i$, that is initially empty. At the termination of the process illustrated by FIG. 5, the set $S_i$ for a shop i may include a set of jobs that can be completed before their deadlines by shop i.

In an embodiment, while $x_j < m$, an electronic dispatch system may select 504 a print job having the earliest deadline, which may be denoted by $J_d$. An electronic dispatch system may perform 506 a simulation of the operation of shop $x_j$ with the print jobs in the set $J_d \cup S_{x_d}$. If all of the print jobs in the set $J_d \cup S_{x_d}$ are completed before their deadlines, an electronic dispatch system may add 508 the index of job $J_d$ to the set $S_{x_d}$. If one or more print jobs in the set $J_d \cup S_{x_d}$ are not completed before their deadlines, an electronic dispatch system may take no action. An electronic dispatch system may update $x_d$ to $x_d+1$. An electronic dispatch system may, for each print shop $i \in 1, \ldots, m$, return 510 a feasibility matrix in the form of a binary n-dimensional vector that takes value '1' in the jth position if job j is in the set $S_i$. Otherwise, it may take a value of '0'.

Referring back to FIG. 3, an electronic dispatch system may determine 312 a preliminary assignment of print jobs to print shops. An electronic dispatch system may use a set-cover heuristic that receives as input a returned feasibility matrix and a cost function in determining 312 a preliminary assignment of print jobs.

In an embodiment, the cost function of an arbitrary shop s may map a set of jobs $J_a, \ldots, J_d \in \{J_1, \ldots, J_l\}$ and the shop and client locations, $L_s$ and $L_{client}$, to the cost of processing and shipping all jobs $J_a, \ldots, J_d$ in shop s. The total cost of producing jobs $J_a, \ldots, J_d$ in shop s may be denoted as $C(\{J_a, \ldots, J_d\}, L_{client}, L_s)$.

For each job j for $j \in 1, \ldots, l$, the status of job j at iteration t may be defined as a variable that may take one of two possible values: SCHEDULED or NOT_SCHEDULED. The status of job j at time t may be denoted as $h_j^t$. For each shop s for $s \in 1, \ldots, m$, $S_s^t$ may be defined as the set of indices of jobs that are already scheduled at the start of iteration t. $S_s$ may be defined as the set of indices of the unscheduled jobs that could be processed by shop s according to the feasibility matrix, W. If $j \in S_s$, then $W_{js}=1$. It is assumed that at the start of the process for an arbitrary $j \in 1, \ldots, l$, $W_{js}=1$ for at least one $s \in 1, \ldots, m$.

In an embodiment, a set heuristic may include the steps represented by the pseudocode below and may rely on the following assumptions:
1. $S_s^t = 0$
   $\forall s \in 1, \ldots, m$
   $h_j^t$ takes the value NOT_SCHEDULED for all jobs $1, \ldots, l$
   $t=0$ 2. If $h_j^t$ is equal to SCHEDULED for all $j \in 1, \ldots, l$, return $S_s^t$ for all $s \in 1, \ldots, m$. Otherwise, proceed to step 3.
3. Determine:

$$s^* = \arg \min_{s \in 1, \ldots, m} \frac{C(S_s \setminus \bigcup_{s=1}^{m} S_s^t, L_{client}, L_s)}{|S_s \setminus \bigcup_{s=1}^{m} S_s^t|}$$

4. Let $S_{s^*}^{t+1} = S_{s^*}^t \cup [S_{s^*} \setminus \bigcup_{s=1}^{m} S_s^t]$
   Then update the status of jobs within indexes in $S_{s^*} \setminus \bigcup_{s=1}^{m} S_s^t$ to SCHEDULED and update t to t+1. Go to step 2.

The variable T may represent the value of t at termination, or the total number of iterations. The set heuristic described above may output the set of indices $S_s^t$ for $s=1, \ldots, m$ for some $T \geq 0$ such that an arbitrary index $j \in 1, \ldots, l$ is in $S_s^t$ if and only if job j was assigned to shop s to be processed. The output of the set heuristic may be represented by $A_{SC}$.

In an embodiment, $A_{SC}$ may represent a preliminary assignment of jobs to one or more shops. $A_{SC}$ may not be the final assignment of jobs to shops, but it may be used to search for an assignment with a lower processing cost. For example, an electronic dispatch system may provide as input to a linear programming (LP)-based heuristic as described in more detail below. In other embodiments, $A_{SC}$ may be used as a final assignment of jobs to shops. For example, $A_{SC}$ may be used as a final assignment of jobs to shops when response times are required to be short, when an LP-based heuristic is not available and/or the like.

In an embodiment, an electronic dispatch system may determine 314 a final assignment of print shops to print shops. An electronic dispatch system may use an LP-based procedure to assign print jobs to print shops to minimize the processing cost while meeting the jobs' deadlines. A LP-based heuristic may receive as input the assignment $A_{SC}$, the feasibility matrix W, and the shop's cost function. An LP-based heuristic may return as output a final assignment, $A_f$, with a cost that does not exceed the cost associated with $A_{SC}$.

In an embodiment, an LP-based heuristic may operate under the following assumptions:
A pattern, a, is a 0-1 1-dimensional vector that defines a subset of jobs in the order
$A^k = (a_1^k, \ldots, a_n^k)$ is defined as the $k^{th}$ pattern
S(k) is a set of indices of shops that can process pattern k in time
S is the set of indices of shops, by definition: $S = \bigcup_{j=1}^{i0} S(j)$, assuming $S = \{1, \ldots, m\}$
$C_{ks}$ is the cost of producing the $k^{th}$ pattern at shop s
A is the set of indices of all patterns
f is a 0-1 n-dimensional vector that takes value '0' in the $j^{th}$ component if there is no shop that claims to be able to process job j in time, otherwise it takes value '1'.

In an embodiment, the problem of finding an assignment with minimum cost may be formulated as an integer programming problem represented by:

$$z = \min \sum_{k \in A} \sum_{s \in S(k)} c_{ks} \cdot p_{ks} \qquad \text{Equation (1)}$$

$$\text{s.t} \sum_{k \in A} \sum_{s \in S(k)} a^k \cdot p_{ks} = f$$

A pattern, a, may be a feasible pattern in shop s if and only if $a_j \leq W_{js}$ for all j $1, \ldots, l$. If F is an arbitrary assignment, a pattern ak is said to be assigned to shop s in assignment F if, for every j∈1, . . . , m such that $a_j^k=1$, job j is assigned to shop s in assignment F.

In an embodiment, $p_{ks}$ may be a binary decision variable that takes value '1' if the kth pattern is assigned to the shop s in a given solution, and '0' otherwise. The parameters of Equation 1 above are the cost of processing the $k^{th}$ pattern in shop s for all shops in S(k) and the set of all feasible patterns. The objective function may be to minimize the total cost of an assignment. The unique set of constraints enforces that every job that can be processed is assigned to one and only one shop to be processed.

In an embodiment, $A_{trunc}$ may be defined as a subset of all feasible patterns for a particular print shop network. The LP-based heuristic described in this disclosure may use information provided by the simplex multipliers of the LP relaxation of the problem in Equation 2 below to find new patterns that may improve the cost of the resulting assignment. Instead of generating all possible patterns, the described procedure searches for patterns associated with variables that could potentially enter an optimal basis of the problem in Equation 2. The process may also search for patterns with a negative reduce cost. The search may be done through iterations, where, in each iteration, a pattern is computed and added to $A_{trunc}$. In an embodiment, q may represent the vector of simplex multipliers associated with the m constraints defined by $$\Sigma_{k \in A_{trunc}} \Sigma_{s \in S(k)} a^k \cdot p_{ks} = f.$$

$$z_{trunc} = \min \sum_{k \in A_{trunc}} \sum_{s \in S(k)} c_{ks} \cdot p_{ks} \quad \text{Equation 2}$$

$$\text{s.t} \quad \sum_{k \in A_{trunc}} \sum_{s \in S(k)} a^k \cdot p_{ks} = f$$

To find a pattern associated with a variable with negative reduce cost, Equation 3 (below) may be solved with decision variables a and $x_s \forall s \in 1, \ldots, m$. Equation 3 may receive as parameters the dual variables q of Equation 2, and a cost vector ĉ which may depend on the actual cost function c and the feasibility matrix W. M may be an n-dimensional vector of arbitrary large positive number uses to enforce that when variable $y_s$ takes value '0', the resulting pattern a is feasible to shop s. In other words, that for all j such that $a_j=1$, then $w_{js}=1$.

An optimal solution to Equation 3 may be denoted by w(q) to emphasize that q and ĉ are parameters that vary from one iteration to another.

$$u(q, \hat{c}) = \max \quad (\hat{c} - q') \cdot a$$

$$a \leq W_s + M \cdot y_s \; \forall s = 1, \ldots, m$$

$$\text{s.t} \quad \sum_{s=1}^{m} y_s \leq m - 1$$

$$x_s \in \{0, 1\} \forall s \in 1, \ldots, m.$$

Equation 3 has, as decision variables, an n-dimensional vector a and variables $x_s$ for each shop s∈1, . . . , m, and where $\vec{M}$ is an n-dimensional vector that takes value $m_i$=m>>0. The constraints of Equation 3 help ensure that the optimal value of variable a is a valid pattern for at least one shop.

In an embodiment, an electronic dispatch system may initialize an LP-based heuristic by providing it with $A_{SC}$, and an integer constant represented by $N_{iter}$ which is used for the stopping criteria. The variable $n_{iter}$ may be used by the LP-based heuristic as a counter for a stopping condition. A cost function ĉ may be a piece-wise linear approximation of a cost function, c. A cost function, c, may depend on the cost model of a particular shop network in which the described routing process is implemented.

In an embodiment, an electronic dispatch system may implement an LP-based heuristic by performing the steps below where:

$A_{trunc}$=0, S(k)=0 for all k∈$A_{trunc}$
$n_{iter}$=0

1. Compute the patterns $a^1$ to $a^s$ from the assignment computed with the set cover heuristic $A_{SC}=\{S_s^t\}$ by, for all s∈1, . . . , m and for all j∈1, . . . , 1, if j∈$S_s^t$, let $a_{jks}=1$, otherwise let $a_{jk}^s=0$.

2. For all j∈1, . . . , 1 let $a^{s+j}=e_j$, where $e_j$ is the jth column of an 1-dimensional identity matrix.

3. Update the set $A_{trunc}$ adding the indices 1, . . . , 1+s+1. At the termination of this step, $A_{trunc}$ has s+1 indices.

4. Update the set S(k) for k=1, . . . , |A| as follows: for every s=1, . . . , m if $a^k \leq W_s$ add s to S(k).

5. Solve the following equation and compute corresponding dual variables, q $$z_{trunc} = \min \Sigma_{k \in A_{trunc}} \Sigma_{s \in S(k)} c_{ks} \cdot p_{ks}$$

$$s \cdot t \; \Sigma_{k \in A_{trunc}} \Sigma_{s \in S(k)} a^k \cdot p_{ks} = f$$

6. Solve the following equation with input q and ĉ, $$u(q, \hat{c}) = \max(\hat{c} - q') \cdot a$$

$$a \leq W_s + M \cdot y_s \forall s = 1, \ldots, m$$

$$s \cdot t \; \Sigma_{s=1}^{m} y_s \leq m - 1$$

$$x_s \in \{0, 1\} \forall s \in 1, \ldots, m.$$

a* may be the optimal solution:
(a) if a* is a new pattern, equivalently $a^* \neq a^k$ for k= 1, . . . , |A|, let a*, update A and go to step 4, reset $N_{iter}$ to '0'
(b) if a* is not a new pattern and niter <$N_{iter}$, update ĉ and increase $n_{iter}$ by 1
(c) otherwise, stop The output of the LP-based heuristic may be a final assignment of print jobs to print shops. In an embodiment, an electronic dispatch system may cause 316 one or more of the selected print jobs to be routed to the assigned print shop. For example, an electronic dispatch system may remove a selected print job from a scheduling queue, and may transmit the print job to its assigned print shop. The assigned print shop may receive the print job, and may process the print job.

In an embodiment, an electronic dispatch system may transmit one or more instructions along with one or more print jobs. The instructions may cause one or more print production devices in an assigned print shop to process the transmitted print job. For example, if a print job having a print job type of {printing, binding} is assigned to print shop s, an electronic dispatch system may generate one or more instructions that instruct one or more print production resources of print shop s to print and bind the print job. The electronic dispatch system may transmit the generated instructions to the print shop. Upon receipt of the instructions, the print shop may execute such instructions with respect to the received print job, and may process the print job according to the instructions.

In an embodiment, the described methodology may be used as a diagnostic tool for the overall network's load balancing performance. For example, it may provide insight into whether there are shops operating on low load conditions during a period of time, or whether a certain print shop is capable of absorbing the workload of another print shop.

Figure 6:
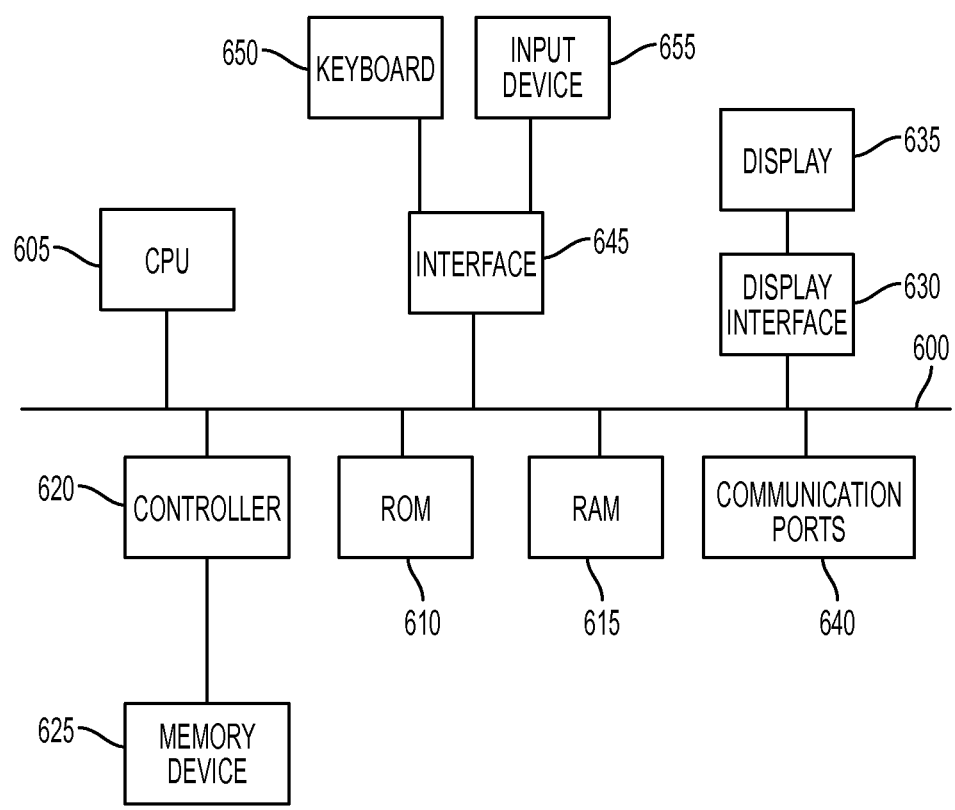
FIG. 6 illustrates a block diagram of example hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible, non-transitory computer-readable medium such as a compact disk, a digital disk, flash memory, a memory card, a USB drive, an optical disc storage medium and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system for performing queue-based routing of print jobs in a multi-site print production environment, the system comprising:
an electronic dispatch system comprising a scheduling queue, at least one processor and a non-transitory computer-readable storage medium, wherein the non-transitory computer-readable storage medium comprises one or more programming instructions that, when executed, cause the processor to:
receive a plurality of print jobs from one or more client computing devices, wherein each print job is associated with a completion deadline,
store the received print jobs in the scheduling queue,
identify one or more print shops in communication with the electronic dispatch system,
select a set of print jobs from the scheduling queue that are to be assigned to the print shops for completion,
generate a feasibility matrix for the selected print jobs, wherein the feasibility matrix indicates, for each selected print job, one or more of the print shops that are able to process the print job and satisfy the corresponding completion deadline,
determine a preliminary assignment of the selected print jobs to the identified print shops using a set cover heuristic that accepts as input the feasibility matrix and one or more cost functions associated with one or more of the print shops, wherein each cost function is representative of a cost of processing and shipping the selected print jobs to the corresponding print shop,
use a linear programming heuristic to determine a final assignment of the selected print jobs to the identified print shops, wherein the final assignment minimizes a processing cost associated with the selected print shops, wherein the linear programming heuristic accepts as input the preliminary assignment, the feasibility matrix and one or more cost functions associated with one or more of the print shops, and
route each of the selected print jobs to an assigned print shop as specified by the final assignment.

2. The system of claim 1, wherein the one or more programming instructions that, when executed, cause the processor to generate a feasibility matrix for the selected print jobs comprise one or more programming instructions that, when executed, cause the processor to generate a feasibility matrix in which as many of the selected print jobs as possible have an offer to be processed by the corresponding completion time by one or more of the identified print shops.

3. The system of claim 1, wherein the one or more programming instructions that, when executed, cause the processor to generate a feasibility matrix for the selected print jobs comprise one or more programming instructions that, when executed, cause the processor to generate a feasibility matrix that prioritizes offers by the identified print shops for print jobs having more immediate completion deadlines.

4. The system of claim 1, wherein the one or more programming instructions that, when executed, cause the processor to determine a preliminary assignment of the selected print jobs to the identified print shops using a set cover heuristic comprise one or more programming instructions that, when executed, cause the processor to:
for one or more of the print shops:
identify a location of the print shop, and
identify a client location from where the selected print jobs are to be sent,
wherein the cost function for the print shop maps the print jobs, the location of the print shop and the client location to a cost of processing and shipping the print jobs to the print shop.

5. The system of claim 1, wherein the preliminary assignment comprises a set of indices, $S_s^T$, for s=1, . . . , m such that an arbitrary index j∈1, . . . , l is in if and only if print job j was assigned to print shop s to be processed, where T represents a total number of iterations of the set heuristic.

6. The system of claim 1, wherein the set cover heuristic comprises the following steps:

a.
$S_s^t = 0$
$\forall s \in 1, \ldots, m$
$h_j^t$ takes the value NOT_SCHEDULED for all jobs 1, ..., 1
t=0 b. If ht is equal to SCHEDULED for all j∈1, ..., 1, return $S_s^t$ for all s∈1, ..., m Otherwise, proceed to step c.

c. Determine:

$$s^* = \arg\min_{s \in 1, \ldots, m} \frac{C(S_s \setminus \bigcup_{s=1}^m S_s^t, L_{client}, L_s)}{|S_s \setminus \bigcup_{s=1}^m S_s^t|}$$

d.
Let $S_{s^*}^t = S_{s^*}^t \cup [S_{s^*} \setminus \bigcup_{s=1}^m S_s^t]$ Then update the status of jobs with indexes in $S_{s^*} \setminus \bigcup_{s=1}^m S_s^t$ to SCHEDULED and update t to t+1 Go to step 2 where:
s=a print shop such that s∈1, ..., m
t=an iteration value of the set cover heuristic
$S_s^t$=a set of indices of print jobs that are already scheduled at the start of iteration t
$h_j^t$=a status of job j at iteration t
$C(\{J_a, \ldots, J_d\}, L_{client}, L_s)$=total cost of producing print jobs $J_a, \ldots, J_d$ in shop s, where print jobs $J_a, \ldots, J_d$ originate from location $L_{client}$ and are transmitted to the location of print shop s, $L_s$.

7. The system of claim 1, wherein the computer-readable storage medium further comprises one or more programming instructions that, when executed, cause the processor to, for one or more selected print jobs:

generate one or more instructions for processing the selected print job based on a print job type associated with the selected print job; and cause one or more print production resources in the assigned print shop to process the selected print job by sending the generated instructions to the assigned print shop.

8. A method for performing queue-based routing of print jobs in a multi-site print production environment, the method comprising:

by one or more processors of an electronic dispatch system:

receiving a plurality of print jobs from one or more client computing devices, wherein each print job is associated with a completion deadline, storing the received print jobs in a scheduling queue of the electronic dispatch system, identifying one or more print shops in communication with the electronic dispatch system, selecting a set of print jobs from the scheduling queue that are to be assigned to the print shops for completion, generating a feasibility matrix for the selected print jobs, wherein the feasibility matrix indicates, for each selected print job, one or more of the print shops that are able to process the print job and satisfy the corresponding completion deadline, determining a preliminary assignment of the selected print jobs to the identified print shops using a set cover heuristic that accepts as input the feasibility matrix and one or more cost functions associated with one or more of the print shops, wherein each cost function is representative of a cost of processing and shipping the selected print jobs to the corresponding print shop, using a linear programming heuristic to determine a final assignment of the selected print jobs to the identified print shops, wherein the final assignment minimizes a processing cost associated with the selected print shops, wherein the linear programming heuristic accepts as input the preliminary assignment, the feasibility matrix and one or more cost functions associated with one or more of the print shops, and routing each of the selected print jobs to an assigned print shop as specified by the final assignment.

9. The method of claim 8, wherein generating a feasibility matrix for the selected print jobs comprises generating a feasibility matrix in which as many of the selected print jobs as possible have an offer to be processed by the corresponding completion time by one or more of the identified print shops.

10. The method of claim 8, wherein generating a feasibility matrix for the selected print jobs comprises generating a feasibility matrix that prioritizes offers by the identified print shops for print jobs having more immediate completion deadlines.

11. The method of claim 8, wherein determining a preliminary assignment of the selected print jobs to the identified print shops using a set cover heuristic comprises, for one or more of the print shops:

identifying a location of the print shop, and
identifying a client location from where the selected print jobs are to be sent,
wherein the cost function for the print shop maps the print jobs, the location of the print shop and the client location to a cost of processing and shipping the print jobs to the print shop.

12. The method of claim 8, wherein the preliminary assignment comprises a set of indices, $S_s^T$, for s=1, ..., m such that an arbitrary index j∈1, ..., 1 is in if and only if print job j was assigned to print shop s to be processed, where T represents a total number of iterations of the set heuristic.

13. The method of claim 8, wherein the set cover heuristic comprises the following steps:

a.
$S_s^t = 0$
$\forall s \in 1, \ldots, m$
$h_j^t$ takes the value NOT_SCHEDULED for all jobs 1, ..., 1
t=0 b. If hi is equal to SCHEDULED for all j∈1, ..., 1, return $S_s^t$ for all s∈1, ..., m Otherwise, proceed to step 3 c. Determine:

$$s^* = \arg\min_{s \in 1, \ldots, m} \frac{C(S_s \setminus \bigcup_{s=1}^m S_s^t, L_{client}, L_s)}{|S_s \setminus \bigcup_{s=1}^m S_s^t|}$$

d.
Let $S_{s^*}^{t+1} = S_{s^*}^t \cup [S_{s^*} \setminus \bigcup_{s=1}^m S_s^t]$
Then update the status of jobs within indexes in $S_{s^*} \setminus \bigcup_{s=1}^m S_s^t$ to SCHEDULED and update t to t+1 Go to step b.

where:
- s=a print shop such that s∈1, ..., m
- t=an iteration value of the set cover heuristic
- $S_s^t$=a set of indices of print jobs that are already scheduled at the start of iteration t
- $h_j^t$=a status of job j at iteration t
- $C(\{J_a, \ldots, J_d\}, L_{client}, L_s)$=total cost of producing print jobs $J_a, \ldots, J_d$ in shop s, where print jobs $J_a, \ldots, J_d$ originate from location $L_{client}$ and are transmitted to the location of print shop s, $L_s$.

14. The method of claim 8, further comprising:

generating one or more instructions for processing the selected print job based on a print job type associated with the selected print job; and causing one or more print production resources in the assigned print shop to process the selected print job by sending the generated instructions to the assigned print shop.

* * * * *